United States Patent [19]

Nielinger et al.

[11] Patent Number: 5,645,945
[45] Date of Patent: Jul. 8, 1997

[54] MULTI-LAYER FILMS MADE FROM COPOLYAMIDES

[75] Inventors: Werner Nielinger; Helmut Schulte; Bernhard Schulte, all of Krefeld; Edgar Ostlinning, Duesseldorf, all of Germany

[73] Assignee: Bayer Aktiengesellschaft

[21] Appl. No.: 563,130

[22] Filed: Nov. 27, 1995

Related U.S. Application Data

[63] Continuation of Ser. No. 26,839, Mar. 5, 1993, abandoned.

[30] Foreign Application Priority Data

Mar. 16, 1992 [DE] Germany .................. 42 08 362.1

[51] Int. Cl.⁶ .................. B32B 27/08; B32B 27/32; B32B 27/34
[52] U.S. Cl. .................. 428/476.3; 428/475.8; 428/476.1; 428/476.9
[58] Field of Search .................. 428/474.4, 475.5, 428/475.8, 476.1, 476.3, 476.9

[56] References Cited

FOREIGN PATENT DOCUMENTS

| 0 104 436 | 4/1984 | European Pat. Off. . |
| 0 335 014 | 10/1989 | European Pat. Off. . |
| 0 458 470 | 11/1991 | European Pat. Off. . |

OTHER PUBLICATIONS

Derwent Database, JP 63 214 445 Sep. 7, 1988.
Derwent Database, JP 56 131 135 Oct. 14, 1981.
Derwent Database, JP 2 084 332 Mar. 26, 1990.

*Primary Examiner*—D. S. Nakarani
*Attorney, Agent, or Firm*—Connolly and Hutz

[57] ABSTRACT

The invention relates to transparent multi-layer films made from polyamides and polyolefines using copolyamides of ε-caprolactam together with diamines and dicarboxylic acids.

4 Claims, No Drawings

MULTI-LAYER FILMS MADE FROM COPOLYAMIDES

This application is a continuation of application Ser. No. 08/026,839 filed on Mar. 5, 1993, now abandoned.

FIELD OF THE INVENTION

The invention relates to transparent multi-layer films made from polyamides and polyolefines using copolyamides of ε-caprolactam with diamines and dicarboxylic acids, preferably hexamethylene diamine and isophthalic acid.

BACKGROUND AND PRIOR ART

Multi-layer films made from polyamides and polyolefines have numerous advantageous characteristics such as great toughness, sealability and low permeability to water vapour, oxygen, carbon dioxide, fats and aromatic substances. They are therefore a preferred means for packaging foodstuffs, not least because of their high transparency and the fact that they can be printed on, whereas many of the characteristics are not present in single-layer films made from polyamides or polyethylene. It stands to reason that the films must also be easy to manufacture and simple to process.

Composite films can be produced by coating, laminating or coextrusion. Copolyamides are polyamide components particularly suitable for blow-coextrusion since homopolyamides do not yield adequately transparent films. With films made from partly crystalline polyamides, on the other hand, the gas permeability increases as the crystallinity decreases, as a result of which the barrier characteristics of films made from copolyamides are less good owing to the fact that their crystallinity is lower. For instance, as measured on a Polyamide 6 film with a thickness of 25 μm, the oxygen permeation value amounts to 45 or 60 $cm^3 \cdot 25$ μm/$m^2 \cdot d \cdot$bar respectively. A copolyamide made from Polyamide 6 and about 6% polyamide units of isophorone diamine and isophthalic acid has a permeation value of 60 or 75 $cm^3 \cdot 25$ μm/$m^2 d \cdot$bar (dry climate or moist climate, respectively).

Entirely amorphous polyamides of isophthalic acid and hexamethylene diamine or copolyamides with terephthalic acid have, in a dry climate, similar oxygen permeation values as Polyamide 6, whereas the steep increase in the permeation values of moist gases, as observed with Polyamide 6, does not occur with these amorphous polyamides. Films made from amorphous polyamides have optically attractive characteristics such as high transparency and gloss, but owing to their high modulus of elasticity they are too stiff to serve as packaging for foodstuffs, do not, in vacuum packages, adapt themselves so smoothly to the contours of the contents and are inclined to develop crease fractures or cracks. That is why they are preferably used to manufacture hollow bodies by the blow-coextrustion process.

It is known from DE 1 669 476 how to produce copolyamides from ε-caprolactam, hexamethylene diamine and isophthalic acid. The use of such copolyamides consisting of 70 to 95 wt.-% of ε-caprolactam and 5 to 30 wt.-% of hexamethylene diamine isophthalate and/or hexamethylene diamine terephthalate in order to produce films capable of shrinking after biaxial stretching is described in the Japanese patent specifications 62 227-626 and 63 214-445. Not all of these products have the required combination of transparency, gloss, gas permeability and processing characteristics.

SUMMARY OF THE INVENTION

It has now been found that as the melt cools down, copolyamides of ε-caprolactam exhibiting a certain recrystallisation behaviour yield films with the desired optimal combination of characteristics. As determined by differential thermal analysis, the crystallisation enthalpy of the copolyamide sample heated to 260° C. should amount to between 2 and 10 but preferably between 4 and 8 J/g, when cooling at a rate of 40 K/min. The object of the invention are transparent multi-layer films made from polyolefines or polyethylene copolymers,, preferably polyethylenes and polyamides, characterised in that at least one layer consists of a copolyamide of 80 to 95 wt.-% of units of the ε-caprolactam and 5 to 20 wt.-% of equimolar amounts of units of a diamine and a dicarboxylic acid exhibiting a crystallisation enthalpy of 2 to 10 J/g as determined by differential thermal analysis while the copolyamide melt cools down at a rate of 40 K/min. Suitable copolyamides are such as consist of ε-caprolactam with diamines and dicarboxylic acids such as hexamethylene diamine, trimethyl hexamethylene diamine, isophorone diamine, bis-(4-aminocyclohexyl)-methane, 3,3'-dimethyl-4,4'-diamino-dicyclohexylmethane, xylylene diamine and adipic acid, sebacic acid, azelaic acid, decane dicarboxylic acid, isophthalic acid and terephthalic acid. Particularly preferred are copolyamides consisting of 83 to 89 but preferably 84 to 87 wt.-% of units of ε-caprolactam and 11 to 17 preferably 13 to 16 wt.-% of equimolar amounts of units of hexamethylene diamine and isophthalic acid.

DESCRIPTION OF PREFERRED EMBODIMENTS

Preferred polyethylene copolymers are copolymers of ethylene and (meth)acrylic acid or ethylene and vinyl acetate or saponified vinyl acetate.

Films made from these copolyamides are characterised by high transparancy and gloss. In spite of a low velocity of crystallisation their oxygen permeation value, which in particular depends only slightly on the moisture content of the gas, is low, compared with films made from copolyamides with a crystallisation enthalpy of more than 10 J/g, for instance copolyamides made from ε-caprolactam, isophorone diamine and isophthalic acid. This enables unproblematic storage of packaged materials, irrespective of climatic variations. In addition, the films are characterised by high transparency and high gloss.

Owing to the low melting point of the copolyamides according to the invention it is possible to process them by the blow-coextrusion method together with thermally sensitive polymers such as ethylene vinyl acetate copolymer (E/VA) and ethylene vinyl alcohol copolymer (E/Val). By comparison with other known copolyamides they have a lower oxygen permeability which is only slightly affected by moisture.

Copolyamides are manufactured in batches or continuously according to known processes, e.g. by Polymerisation of ε-caprolactam, hexamethylene diamine and isophthalic acid, whereby hexamethylene diamine and isophthalic acid are preferably used as an aqueous salt solution, subject to a retention time of the reaction mixture of more than 15 hours and at a temperature of more than 220° C. Preferred is the continuous method of production since this process in particular yields copolyamides with the desired crystallisation behaviour and homogeneous product quality.

The films are produced in known manner by extrusion or coextrusion, in particular by the blow process. When extruding multi-layer films, use is made of the conventional adhesion-promoting agents.

The copolyamides according to the invention are, in particular, processed jointly with other barrier substances so as to produce multi-layer films serving to package foodstuffs while enabling, owing to the exclusion of oxygen, extended durability of the packaged material.

EXAMPLES

Example 1

A copolyamide consisting of 85 parts of Polyamide 6 and 15 parts of the polyamide of isophthalic acid and hexamethylene diamine is extruded in a Reifenhäuser-extruder with a screw diameter of 60 mm so as to produce films. The copolyamide was manufactured continuously, the crystallisation enthalpy during the cooling process applying a cooling rate of 40 k/min amounted to 5.4 J/g and the fusion enthalpy to 36 J/g. Processing took place at a mass temperature of 220° C., and the temperature of the chill roll was 90° C.

Oxygen permeation ($cm^3 \cdot 25$ $\mu m/m^2 \cdot d \cdot bar$) value with a film tickness of 25 μm:
with 0% rel. moisture: 47
with 80% rel. moisture: 51
haze acc. to: ASTM D 103-61)

Example 2

Using the copolyamide described in example 1, E/Val and a polyethylene of low density, a blow-moulded film was manufactured in a 5-layer film blowing plant belonging to Messrs Barmag. The two layers of adhesion promoting agents consisted of MSA-grafted polyethylene. It proved possible, at a mass temperature of the copolyamide between 215° and 220° C., to manufacture the film without any difficulty and without impairing the E/Val.

Sequence of layers: polyethylene (14 μm), adhesion promoting agent (4 μm MSA-grafted PE, type Lexar PLXO-HOO2; Messrs. ethylene vinyl alcohol copolymer (8 μm type EP-E 105 A; Messrs. Kuraray), adhesion promoting agent (6 μm as above), copolyamide according to example 1 (14 μm)

|                                      | rel. moisture content |     |
| ------------------------------------ | --------------------- | --- |
|                                      | 0%                    | 80% |
| gas permeation ($cm^3/m^2 d \cdot bar$) | 4                     | 6   |

Example 3 (comparative example)

A copolyamide manufactured in batches and consisting of 90 parts Polyamide 6 and 10 parts poly-(hexamethylene isophthalamide) is processed, as described in example 1, to a flat film with a thickness of 25 μm. The crystallisation enthalpy in the process of cooling amounts to 37.5 J/g, and the fusion enthalpy to 36.7 J/g.
The haze amounts to 2.1%.

Oxygen permeation value with a film thickness of 25 μm
with 0% rel. moisture: 48
with 80% rel. moisture: 59

Example 4 (comparative example)

A copolyamide consisting of 94 parts Polyamide 6 and 6 parts of a polyamide of isophorone diamine and isophthalic acid was processed to a film as described in example 1. The mass temperature amounted to 240° C., the crystallisation enthalpy in the process of cooling the copolyamide to 34 J/g and the fusion enthalpy to 45 J/g.

Haze: 4.1%

Oxygen permeation value with a film thickness of 25 μm
with 0% rel. moisture: 60
with 80% rel. moisture: 75

We claim:

1. A transparent, multilayer film made from polyolefins and polyamides, wherein at least one layer of the film consists of a copolyamide, the copolyamide containing 84 to 87 wt-% of ε-caprolactam and 13 to 16 wt-% of a polyamide having equimolar amounts of units of a diamine selected from the group consisting of hexamethylene diamine, trimethyl hexamethylene diamine, isophorone diamine, bis-(4-aminocyclohexyl)-methane, and 3,3'-dimethyl-4,4'-diamino dicyclohexylmethane, and wherein the copolyamide exhibits a crystallization enthalpy of 4 to 8 J/g, determined by differential thermal analysis, when cooled at 40 K/min.

2. A film as claimed in claim 1 wherein the polyolefin forms a separate layer, and the polyolefin layer is composed of polyethylene or, an ethylene vinyl acetate copolymer, or an ethylene vinyl alcohol copolymer.

3. A film as claimed in claim 2, wherein the diamine is hexamethylene diamine.

4. A film as claimed in claim 1, wherein the diamine is hexamethylene diamine.

* * * * *